United States Patent
Tohme et al.

(10) Patent No.: US 9,690,017 B2
(45) Date of Patent: Jun. 27, 2017

(54) SPHERICALLY MOUNTED RETROREFLECTOR AND METHOD OF MAKING THE SAME

(71) Applicant: FARO Technologies, Inc., Lake Mary, FL (US)

(72) Inventors: Yazid Tohme, West Chester, PA (US); Kenneth Steffey, Longwood, FL (US); Jeremy Markee Garey, Landenberg, PA (US); Jonathan Robert Day, Wilmington, DE (US)

(73) Assignee: FARO TECHNOLOGIES, INC., Lake Mary, FL (US)

(*) Notice: Subject to any disclaimer, the term of this patent is extended or adjusted under 35 U.S.C. 154(b) by 199 days.

(21) Appl. No.: 14/669,745

(22) Filed: Mar. 26, 2015

(65) Prior Publication Data
US 2015/0276996 A1    Oct. 1, 2015

Related U.S. Application Data

(60) Provisional application No. 61/972,775, filed on Mar. 31, 2014.

(51) Int. Cl.
*G02B 5/122* (2006.01)
*G01S 17/66* (2006.01)
*G01S 7/481* (2006.01)
*G01S 7/499* (2006.01)

(52) U.S. Cl.
CPC .............. *G02B 5/122* (2013.01); *G01S 7/481* (2013.01); *G01S 7/499* (2013.01); *G01S 17/66* (2013.01); *Y10T 156/1064* (2015.01)

(58) Field of Classification Search
CPC ........ G02B 5/124; G02B 5/122; G02B 7/182; G01C 15/02

USPC .................................................. 359/529, 530
See application file for complete search history.

(56) References Cited

U.S. PATENT DOCUMENTS

| 5,893,214 A | 4/1999 | Meier et al. |
| RE44,150 E * | 4/2013 | Cramer ................ G01C 15/002 356/154 |
| 9,329,028 B2 * | 5/2016 | Bridges ................. G01B 11/14 |

(Continued)

FOREIGN PATENT DOCUMENTS

| DE | 102006046435 A1 | 4/2008 |
| EP | 1709252 A1 | 8/2005 |

OTHER PUBLICATIONS

PCT International Search Report and Written Opinion of the International Searching Authority for International Application No. PCT/US2015/023479, Oct. 14, 2015, 17 pages.

*Primary Examiner* — Bumsuk Won
*Assistant Examiner* — Grant Gagnon
(74) *Attorney, Agent, or Firm* — Cantor Colburn LLP

(57) ABSTRACT

A spherically mounted retroreflector (SMR) includes a substrate, an optic, and an adhesive. The substrate has a partially spherical outer surface and a cavity, the partially spherical outer surface has a sphere center. The optic has a cube-corner retroreflector fixedly disposed within the cavity; the cube-corner retroreflector has an optical vertex. The adhesive is disposed between the optic and the substrate and fixedly adheres the optic to the substrate. The optical vertex is coincident with the sphere center. The substrate is made from a ferromagnetic material and has an electroless nickel outer coating.

43 Claims, 3 Drawing Sheets

(56) References Cited

U.S. PATENT DOCUMENTS

| | | | |
|---|---|---|---|
| 2003/0020895 A1* | 1/2003 | Bridges | G01S 7/4811 356/4.01 |
| 2003/0198814 A1 | 10/2003 | Khieu et al. | |
| 2005/0179890 A1* | 8/2005 | Cramer | G01B 11/002 356/138 |
| 2005/0185182 A1* | 8/2005 | Raab | G01S 7/497 356/399 |
| 2009/0040306 A1 | 2/2009 | Foote et al. | |
| 2009/0109426 A1* | 4/2009 | Cramer | G01B 11/005 356/154 |
| 2009/0128910 A1 | 5/2009 | Mohazzab et al. | |
| 2011/0176145 A1* | 7/2011 | Edmonds | G01B 11/026 356/601 |
| 2011/0206532 A1 | 8/2011 | Sorbo et al. | |
| 2011/0284384 A1* | 11/2011 | Hubbs | G02B 5/122 205/50 |
| 2012/0206716 A1* | 8/2012 | Cramer | G01B 11/03 356/72 |
| 2012/0206808 A1* | 8/2012 | Brown | G02B 5/122 359/529 |
| 2014/0098381 A1* | 4/2014 | Bridges | G01B 11/002 356/614 |
| 2014/0098382 A1* | 4/2014 | Bridges | G01B 5/0014 356/614 |
| 2014/0098383 A1* | 4/2014 | Bridges | G01C 15/002 356/614 |
| 2014/0313521 A1* | 10/2014 | Bridges | G01S 17/66 356/614 |
| 2014/0340750 A1* | 11/2014 | Neal | G02B 5/122 359/529 |
| 2015/0022826 A1* | 1/2015 | Cramer | G01S 17/66 356/620 |
| 2015/0285615 A1* | 10/2015 | Bridges | G01S 17/42 356/4.01 |
| 2015/0285903 A1* | 10/2015 | Bridges | G01C 15/002 356/4.01 |
| 2015/0308818 A1* | 10/2015 | Bridges | G01S 17/66 356/3.02 |
| 2016/0341541 A1* | 11/2016 | Bridges | G01B 11/002 |

\* cited by examiner

SPHERICALLY MOUNTED RETROREFLECTOR AND METHOD OF MAKING THE SAME

CROSS REFERENCE TO RELATED APPLICATIONS

The present application claims the benefit of U.S. Provisional Patent Application Ser. No. 61/972,775 filed on Mar. 31, 2014, the contents of which are incorporated by reference herein in its entirety.

BACKGROUND OF THE INVENTION

The present disclosure relates generally to spherically mounted retroreflectors, and particularly to heavy duty break resistant spherically mounted retro reflectors.

A laser tracker instrument measures the coordinates of a point by sending a laser beam to a retroreflector target in contact with the point. The instrument determines the coordinates of the point by measuring the distance and the two angles to the target. The distance is measured with a distance-measuring device such as an absolute distance meter (ADM) or an interferometer (IFM). The angles are measured with an angle-measuring device such as an angular encoder. A gimbaled beam-steering mechanism within the instrument directs the laser beam to the point of interest.

Ordinarily the laser tracker sends a laser beam to a retroreflector target. A common type of retroreflector target is the spherically mounted retroreflector (SMR), which includes a cube-corner retroreflector embedded within a metal sphere. The cube-corner retroreflector includes three mutually perpendicular mirrors. The vertex, which is the common point of intersection of the three mirrors, is located near the center of the sphere. Because of this placement of the cube corner within the sphere, the perpendicular distance from the vertex to any surface on which the SMR rests remains nearly constant, even as the SMR is rotated. Consequently, the laser tracker can measure the 3D coordinates of a surface by following the position of an SMR as it is moved over and held in contact with the surface. Stating this another way, the laser tracker needs to measure only three degrees of freedom (one radial distance and two angles) to fully characterize the 3D coordinates of a surface.

The most precise applications are pushing for every micron of accuracy possible so every element of the SMR is important. The most accurate SMR models require the highest precision and quality spheres, near perfect geometry and clarity of the optics, assembled with processes that hold mere microns as tolerances. These state of the art opto-mechanical assemblies are verified by high performance instruments in temperature controlled rooms to confirm that design criteria are fully met. When combined with modern laser trackers, extreme accuracy and range are achievable.

Presently, there are three basic configurations of retroreflectors in SMRs: a solid glass retroreflector, an open air retroreflector, and a version of the open air SMR that has a window covering. Construction of an SMR starts with a solid stainless steel sphere. SMRs are expected to be accurate and durable and it is the steel sphere that provides the contact surface for the measurement and protects the optics from damage during use. Different alloys of stainless steel are used to balance magnetic properties against corrosion resistance. Steel spheres are categorized into grades that describe their dimensional properties. A common ball grade for an SMR is Grade 25. The number 25 refers the sphericity in millionths of an inch (0.000025 inches). The other properties of the ball are also controlled by the grade specification. A Grade 25 ball specifies a surface roughness tolerance of no more than 0.000002 inches and a diameter tolerance of +/−0.0001 inches.

The heart of the SMR is the cube-corner retroreflector. In one type of SMR, three flat glass panels are bonded together to make the cube-corner retroreflector. Before the flat glass panels are assembled into cube corners, they are most often coated with protected silver. The panels are often matched to minimize polarization effects and reflectance variation. The three glass panels are bonded into an assembly, which is centered in the sphere. Glass-panel SMRs can provide some of the highest performance targets available. However, a weakness of glass-panel SMRs is the glass panels themselves, which are easily broken if dropped, subjected to an impact load, or just not handled carefully.

Through the common handling abuse that may occur during daily use, the adhesive bonding to the three glass panels can release the whole optical assembly, or a single panel within the assembly can shift from its nominal position. This can distort the beam and lead to errors in measurements.

A second type of SMR is the integrated optic SMR, which is a solid steel sphere where the retroreflector is machined directly into the sphere. Creating the three mutually perpendicular surfaces into a hardened sphere requires time and expensive processes such as electrical discharge machining (EDM) that lead to the higher costs. The optical reflective surfaces are transferred into the sphere through a process called replication. A replicated optic begins by coating a master with gold as an optical surface and release agent and then a thin layer of epoxy. The machined metal is referred to as a substrate and is pressed onto the master and allowed to cure. The adhesive layer takes up any variation in the surface of the substrate leaving a precise copy of the master when removed from the tool. While this design represents the most break resistant and stable design, machining of the hardened steel has limited the possible accuracy. Unlike glass panels having surfaces that are stiff and flat, replicated optics have surfaces that are relatively soft and can be damaged through aggressive cleaning. Because the entire SMR is made almost entirely of steel, with only a thin epoxy layer, the integrated optic SMR design has proven to be very stable over extreme temperature changes.

A third type of SMR features a single replicated optic mounted into a hardened stainless steel sphere. The optic is manufactured in a replication process similar to that of the integrated optic SMR, with the difference being the material out of which the cube-corner optic is made. In place of the difficult-to-machine hardened steel, aluminum is often used for the body of the optic. The single optic is an aluminum cylinder with the three mutually perpendicular faces machined and the gold reflective surfaces applied through replication. The third type of optic is usually less expensive to manufacture than the second type. The assembly process for the third type of SMR is similar to that of the glass panel SMR in that the retroreflector is centered in the sphere and secured by a high performance adhesive. This design allows for very precise centering, yielding an SMR with high accuracy.

The second type of SMR is inherently break resistant, and it is possible through careful design to also make the third type of SMR break resistant. Break resistant SMRs may be dropped onto a hard floor without the vertex of the SMR moving in relation to the SMR spherical surface. To make the third type of SMR break resistant, the type and thickness of the adhesive layer must be carefully considered in light of the properties of the replicated slug and the spherical portion.

In view of the high degree of accuracy required of SMRs, it will be appreciated that the different SMR properties can significantly impact a laser tracker's ability to track and measure to the fullest of its capabilities. The stainless steel ball can contribute to measurement uncertainty if the sphericity or diameter is not known accurately or if it becomes worn and develops flat spots or areas where the diameter is not nominal. Radial measurement systems are susceptible to polarization errors in an improperly manufactured SMR. A common cause of polarization error is the uneven application of the protective coatings on protected silver retroreflectors. Most laser tracker systems are sensitive to polarization in one mode or another. If the SMR causes the polarization state to change and the IFM system requires a certain state, then the optical interference pattern may not be created clearly. Some laser trackers utilize a polarization modulation technology for their ADM that could be impacted by a changed polarization state of an SMR. Mirrors with poor reflectance from poor coatings or damaged optical surfaces will return a weak signal. In this case, the SMR may track poorly or, more importantly, the ADM or IFM system may have reduced measurement accuracy. The transverse measurement performance can be impacted by the SMR as described in ASME B89.4.19-2006, Appendix B. The B89 document discusses 3 types of SMR uncertainty contributions. The first two are mechanical properties related to the lateral and radial centering of the retroreflector in the sphere. The third property is related to dihedral angle errors. The dihedral angle error is the deviation in the angles of the adjacent panel from perpendicular. This deviation can cause measurement errors in trackers for the case in which a position sensitive detector (PSD) "retrace point" is not properly set. Laser trackers are compensated to establish the retrace position but this compensation is not perfect. Consequently, it is important that the SMR is manufactured to a specific dihedral angle tolerance and that these dihedral angles are maintained over use. An explanation of the condition in B89.4.19, Appendix B, is where one or two of the SMR panels have a high dihedral angle error in respect to the others. As a result, the optical center can be shifted and not represent the mechanical center of the retroreflector. The offset beam will cause the apparent center of the beam to change as the SMR is rotated in a nest. This type of error is called runout error and may be the result of either the cube corner within the sphere being off center or a dihedral angle error. However, the runout patterns have a different appearance when the cube corner is off center and dihedral angle error exists, as is explained in the B89.4.19 standard, Appendix B.

Another dihedral angle error occurs when all three panels are tilted into the center or away from the center. If the beam becomes expanded enough on the return, it can clip on the optics and cause the beam on the PSD not to be round (Gaussian) as is preferred.

Beyond the errors in the centering of the vertex with respect to the spherical surface, there are several other specifications that are significant to an SMR's performance. An SMR is supposed to return the laser beam to the tracker without added distortion. SMR induced errors can be the result of dihedral angle errors, as described above, or wave front distortion. Dihedral angle errors are generally reported with two values: total error and adjacent angle error.

Total error can cause the beam to expand or contract on the return path to the tracker. This may cause the beam shape to distort. Adjacent angle error, on the other hand, can lead to a shift in the optical center of the beam and produce optical runout when rotating the SMR. Wavefront distortion is a measure of the change in the wavefront shape as a result of reflection off the mirror panels of the SMR. It may be caused by panels that are not perfectly flat. When the laser beam is reflected off an SMR having panels that are not flat, the wavefront is altered from its original flat form. This can result in increased error in the systems of the tracker, including the IFM, ADM, and angle measuring systems. The term wavefront distortion refers to a composite measurement of distortion that includes effects due to panel flatness and dihedral angle errors since both effects influence the wavefront of the laser beam returning from the retroreflector. Within the reflective region of the SMR, the center of the target is the most critical as this is the area where the power of the laser beam is most concentrated.

A specification that quantifies the quality of the retroreflector in this critical region is called central wavefront distortion. As an example, this specification may consider wavefront quality over just the central 6 mm region of the cube corner.

To meet customer requirements, an SMR needs to maintain the required performance over the temperature range of the laser tracker and not be permanently altered at the even more extreme potential storage temperatures. The storage temperature range is typically −40° C. to 70° C., while the operating temperature range is typically −15° C. to 50° C. The target needs to be able to be subjected to these extreme storage temps and return to the in-tolerance specifications and geometry for the operational temperature range.

In addition to withstanding the above noted temperature ranges, to be considered break-resistant, the SMR must be capable of maintaining the optic in the proper position over the operational temperature range while withstanding at least 10 drops to a concrete floor from a standard operating height. At the same time, it has to be stiff enough to maintain the cube corner at the same position over time.

There are two types of mechanical deformation that can occur under strain of extreme temperature changes, with or without impact loading; elastic and plastic. Elastic deformation means that the geometry of the SMR may exceed tolerance at the ends of the storage temperature range but return to an in-tolerance condition within the operating temperature range. Plastic deformation means that the geometry of the SMR is permanently altered to an out-of-tolerance condition even when returned to ambient temperatures.

As explained hereinabove, an SMR is an extremely high precision instrument, where the vertex of a cube-corner retroreflector within an SMR is ideally placed at the exact center of the sphere into which the cube-corner is embedded. In practice, however, the position of the vertex is off the center of the sphere by up to a few thousandths of an inch. In many cases, the difference in the positions of the vertex and the sphere center are known to high accuracy, but for some SMR designs the position of the vertex relative to the sphere center may change significantly with temperature. Furthermore, this data may be rendered valueless if the SMR is subjected to extreme temperatures and/or is dropped or subjected to an impact force that displaces the vertex of the cube-corner retroreflector.

A particular difficulty encountered in the manufacture of SMRs is obtaining the very small value of sphericity ordinarily desired—for example, a sphericity of 25 millionths of an inch for a grade 25 ball. In one machining strategy, a cavity is machined into a sphere to provide a pocket for a retroreflector insert. In some cases, the sphericity of the ball may be degraded by machining the cavity. To avoid this potential degradation, another machining operation may be performed afterwards to obtain the desired sphericity. Ordinarily an SMR must be both very hard and non-corrosive. To obtain the desired corrosion resistance, a material such as SAE 440 stainless steel may be used. The selected material should have high corrosion resistance, easy machinability, suitable coefficient of thermal expansion (CTE), and relatively low cost. To also obtain the desired hardness of the SAE 440 stainless steel while maintaining the ability to machine the ball, the ball may be machined first and heat treated afterwards to harden the steel. A potential problem with this approach is that the heat treatment may degrade the sphericity of the sphere.

While existing SMRs may be suitable for their intended purpose, there remains, however, a need in the art for SMRs that are heavy duty, have improved break resistance over specified temperature ranges, maintain good centering of the vertex within the spherical surface of the SMR, have good sphericity, and are economical to fabricate.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

In an embodiment of the invention a spherically mounted retroreflector (SMR) includes: a substrate comprising a partially spherical outer surface and a cavity, the partially spherical outer surface having a sphere center; an optic comprising a cube-corner retroreflector fixedly disposed within the cavity, the cube-corner retroreflector having an optical vertex; and an adhesive disposed between the optic and the substrate that fixedly adheres the optic to the substrate; wherein the optical vertex is coincident with the sphere center; wherein the substrate is made from a ferromagnetic material and comprises an electroless nickel coating.

In another embodiment of the invention, a method of making a spherically mounted retroreflector (SMR) includes: coating a ferromagnetic metal sphere with electroless nickel; diamond turning the nickel into a spherical portion; applying a protective coating to an outer surface of the nickel; forming a cavity within the sphere; and embedding and adhering a cube-corner retroreflector in the cavity.

In another embodiment of the invention, a spherically mounted retroreflector (SMR) includes: a substrate comprising a partially spherical outer surface and a cavity, the partially spherical outer surface having a sphere center; an optic comprising a cube-corner retroreflector fixedly disposed within the cavity, the cube-corner retroreflector having an optical vertex; and an adhesive disposed between the optic and the substrate that fixedly adheres the optic to the substrate; wherein the optical vertex is coincident with the sphere center; wherein the substrate includes a diamond like carbon (DLC) outer coating.

In another embodiment of the invention, a method of making a spherically mounted retroreflector (SMR) includes: forming a cavity within the sphere; polishing the sphere to a smooth finish; coating a ferromagnetic metal sphere with a diamond like carbon (DLC) coating; and embedding and adhering a cube-corner retroreflector in the cavity.

In another embodiment of the invention, a spherically mounted retroreflector (SMR) includes: a substrate comprising a partially spherical outer surface and a cavity, the partially spherical outer surface having a sphere center; an optic comprising a cube-corner retroreflector fixedly disposed within the cavity, the cube-corner retroreflector having an optical vertex; and an adhesive disposed between the optic and the substrate that fixedly adheres the optic to the substrate; wherein the optical vertex is coincident with the sphere center; wherein the substrate and the optic are each made from a same ferromagnetic material.

In another embodiment of the invention, a method of making a spherically mounted retroreflector (SMR) comprises: forming a sphere from a ferromagnetic material; forming an optic from the ferromagnetic material, same ferromagnetic material as the ferromagnetic material of the sphere; forming a cavity within the sphere; and embedding and adhering the optic in the cavity.

In another embodiment of the invention, a spherically mounted retroreflector (SMR) comprises: a substrate comprising a partially spherical outer surface and a cavity, the substrate being made from a stainless steel material having a defined coefficient of thermal expansion (CTE); an optic comprising a cube-corner retroreflector fixedly disposed within the cavity, the optic being made from a material having a CTE substantially equal to the CTE of the substrate material; and an adhesive disposed between the optic and the substrate that fixedly adheres the optic to the substrate, the adhesive being made from a material having a CTE substantially equal to the CTE of the substrate material.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Figure 1A:
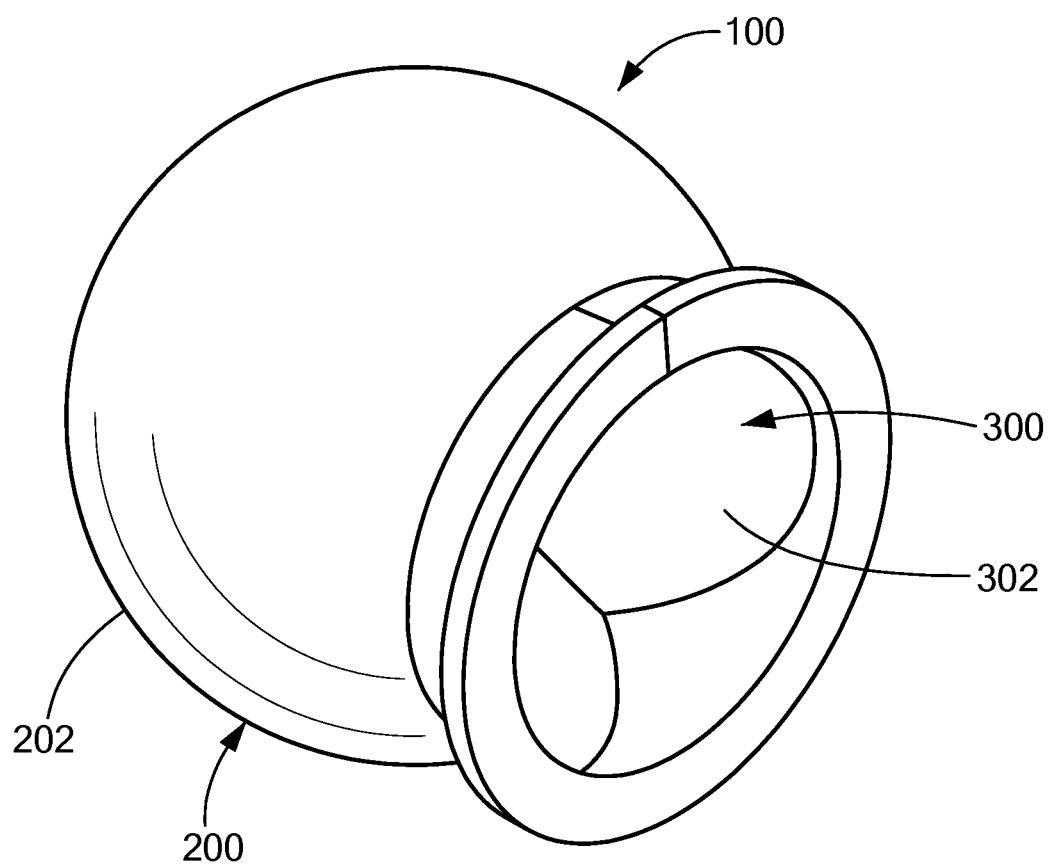
FIGS. 1A, 1B and 1C, depict perspective, cross-sectional, and front views, of an SMR in accordance with an embodiment of the invention.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

An embodiment of the invention, as shown and described by the various figures and accompanying text, provides an SMR having a substrate, an optic and an adhesive, where the material used for each, and the thickness of the adhesive layer, are appropriately selected to provide a robust SMR that can withstand drop tests onto a concrete floor, while minimizing deformation in the dihedral angles of the optic over operational temperature ranges of the SMR. Manufacturing techniques and materials are further selected to ensure the SMR material is hard, non-corrosive, with an outer spherical surface manufactured to a small and stable value of sphericity (form error).

To accomplish the above noted goals, several embodiments are provided herein below, such as: a first SMR embodiment where a ferromagnetic spherical substrate is coated with electroless nickel; a second SMR embodiment where a spherical substrate (ferromagnetic or other suitable material) is coated with a diamond like carbon (DLC) coating; a third SMR embodiment where the spherical substrate and the replicated slug (cube-corner optic) are made of the same ferromagnetic material; and, a fourth SMR embodiment where the materials of the optic and the adhesive each have a coefficient of thermal expansion (CTE) that is substantially equal to the CTE of the substrate. Each embodiment will now be described in turn.

In the first SMR embodiment, a ferromagnetic spherical substrate is coated with electroless nickel and then a diamond-turning machine is used to turn the sphere to grade 25 or better specifications. The use of an electroless nickel coating enables the use of diamond turning of the SMR substrate, which is not typically used for directly turning steel. The spherical substrate that is coated with nickel is made of ferromagnetic material so that it can be held in place by a nest using a magnet, which in practice means that the substrate is made of steel, stainless steel, tool steel, or mild steel. The nickel sphere is then coated with a protective coating to prevent adverse reactions to individuals handling the sphere who may be allergic to nickel. A method that can be used to create spheres for SMRs is to use a lapping method similar to that used with glass optics, which requires multiple applications of different fineness levels of a lapping compound, and consequently has a long turn-around time, which is undesirable for high volume production. Conversely, spheres can be diamond turned relatively quickly. The diamond turned sphere may contain either a cylindrical cavity or a cube-corner cavity for the optic, where the cavity is sized to hold a cube-corner retroreflector. In a sphere with a cylindrical cavity, a replicated cube-corner slug having a cylindrical body is adhered, using an epoxy for example, into the cylindrical cavity. In a sphere with a cube-corner cavity, a cube-corner retroreflector is directly replicated into the cube-corner cavity. A sphere having a cube-corner cavity might be fabricated by machining the cavity into the sphere prior to the diamond-turning process. The sphere can be held in place with a vacuum chuck while the diamond turning process is being performed, or by using any other holding method suitable for a purpose disclosed herein. Where a vacuum chuck is employed, the vacuum chuck is registered to the diamond turning machine so that the vertex of the optic is positioned to be coincident with the physical center of the sphere.

In an embodiment, the sphere is made of a material that is heat treated to increase its hardness. For example, the material might be SAE 440C stainless steel that is heated to a temperature of between 1010 and 1065 degrees Celsius to harden the steel. The steel may then be coated with the electroless nickel before diamond turning to the desired sphericity, which might be 25 millionths of an inch (0.635 micrometer) or better. Alternatively, because electroless nickel is already very hard, heat treatment may not be necessary before or after the diamond turning.

The replication process is carried out by coating a cube-corner master with a release agent, followed by a thin gold layer, followed by epoxy, which in an embodiment is applied to a thickness of about 0.001 inch, or about 25 micrometers. The master is then pressed into the slug and the epoxy allowed to cure. When the master is removed, the reflective gold coating remains on the SMR. Accordingly, this first SMR embodiment includes a spherical substrate made of steel, stainless steel, tool steel, or mild steel, and includes an optic cavity that is either cylindrical or cube-corner. In directly replicated SMRs employing a slug made from mild steel, the intersection lines between the three orthogonal planes of the optic could be machined using a fine drill bit. Alternatively, the slug could be made of a hard material such as tool steel, which could be machined using EDM (Electrical Discharge Machining).

In the second SMR embodiment, a spherical substrate (ferromagnetic or other material) is coated with a DLC coating, which is also referred to as a diamond like carbon or a diamond like coating. Such a coating is very hard and protects the underlying ferromagnetic sphere as the SMR is moved over hard surfaces. In addition, the DLC coating keeps the ferromagnetic magnetic material from rusting. By machining the sphere to a smooth finish (also referred to as polishing), a steel that ordinarily appears gray becomes a shiny silver color. A DLC coating may be used to coat a tool steel or a mild steel for the outer spherical portion of the spherical substrate. An advantage of this approach is that a wider range or relatively softer and more corrosive materials may be used to form the sphere core, with the DLC coating providing the hardness and corrosion resistance. The inner core material may not require heat treatment, thereby eliminating the potential deformation cause by such treatment.

In the third SMR embodiment, the spherical substrate and the replicated slug (cube-corner optic) are made of the same ferromagnetic material, which may be tool steel or mild steel, for example. The steel may be coated with electroless nickel and diamond turned, or it may be coated with another material to prevent corrosion, such as a DLC coating or a chromate conversion coating for example. By using the same material for the substrate and optic, the earlier discussed problems associated with thermal stress are better addressed by the exact matching of the CTEs of the two materials. In this embodiment, the adhesive between the optic and the substrate could be placed in a thin layer over the full area of the slug.

In the fourth SMR embodiment, the materials of the optic and the adhesive each have a coefficient of thermal expansion (CTE) that is substantially equal to the CTE of the substrate. As used herein, the phrase "being made from a material having a CTE substantially equal to the CTE of the substrate material" means a CTE of the respective material relative to the CTE of the substrate material that does not shift the position of the optical vertex, near or at the physical center of the SMR sphere, in relation to its original position over a defined temperature range, or results in a shift that does not exceed a defined tolerance range over a defined temperature range. In an embodiment, the phrase "being made from a material having a CTE substantially equal to the CTE of the substrate material" means that the CTE of the substrate material and the CTE of the optic material differ by no more than 2.0 ppm/° C. at 20° C., and the CTE of the substrate material and the CTE of the adhesive material differ by no more than 3.5 ppm/° C. at 20° C.

Figure 1B:
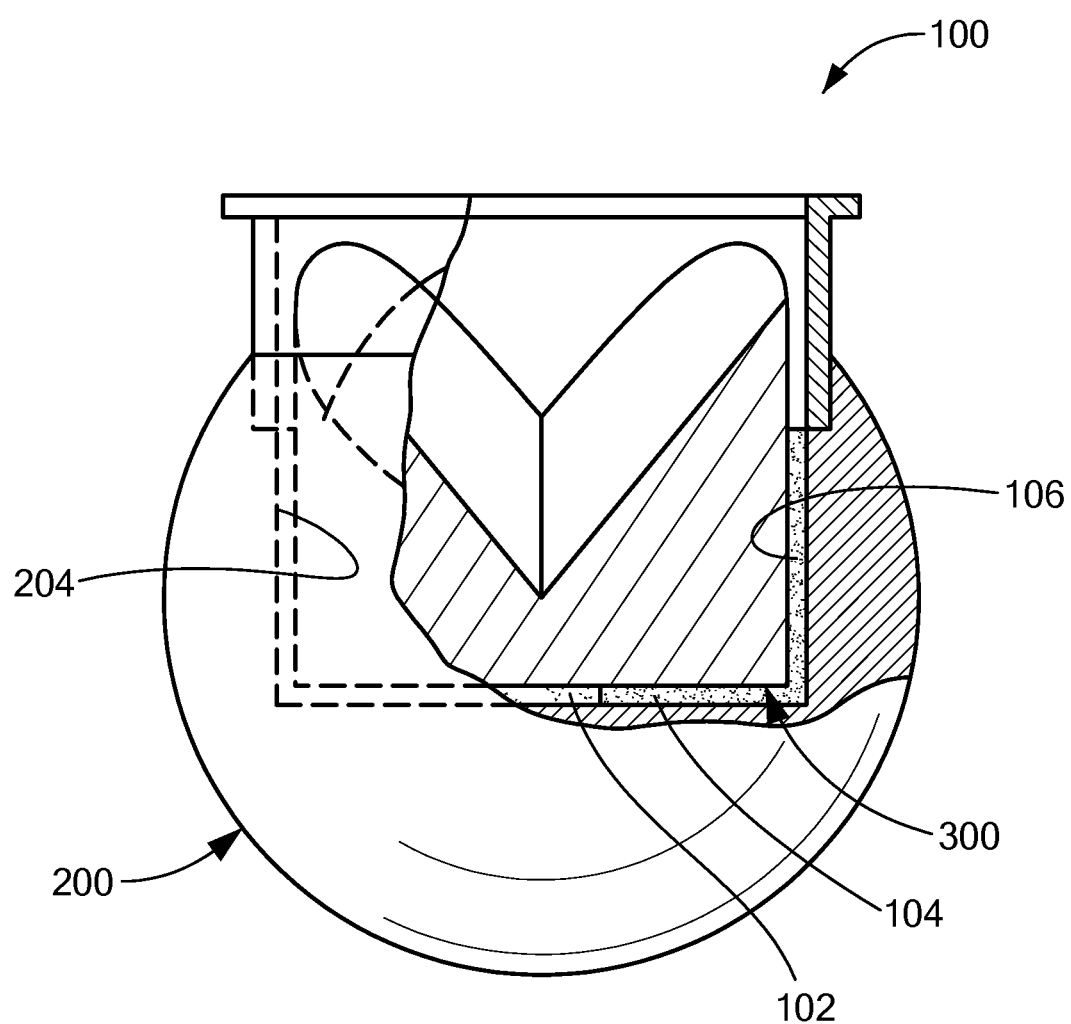
Figure 1C:
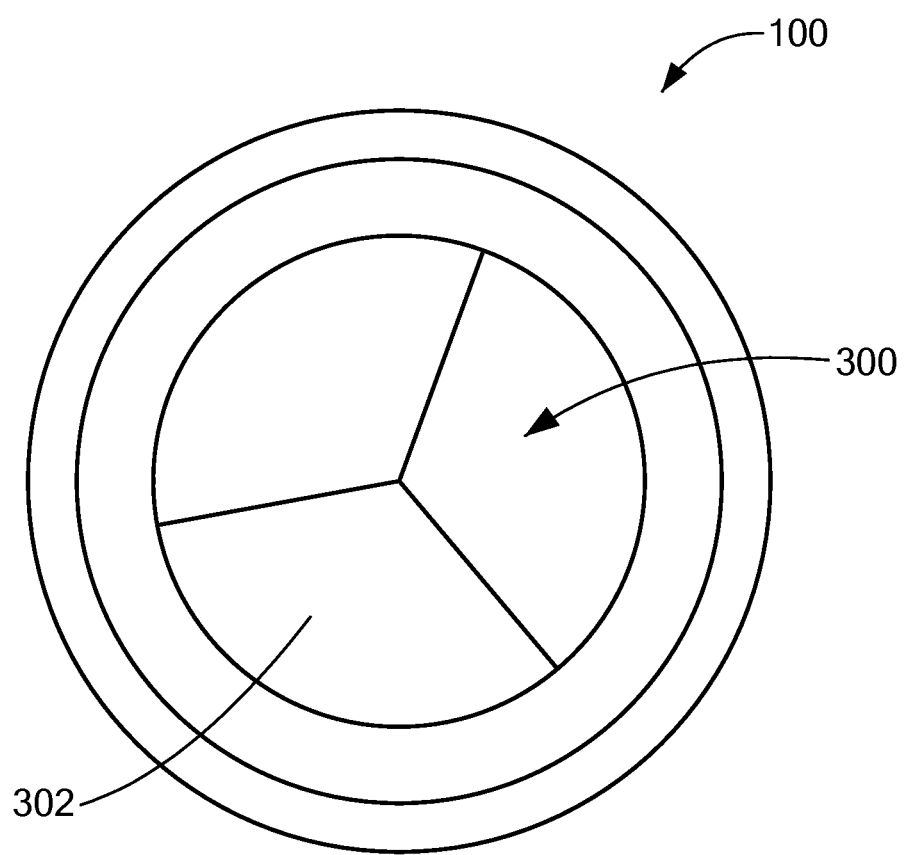

In connection with the four above described embodiments, reference is now made to FIGS. 1A, 1B and 1C, which depict perspective, cross-sectional, and front views, of an SMR 100 made from a substrate 200 with an embedded optic 300, where the optic 300 is embedded in and bonded to the substrate 200 by an adhesive 102. The substrate 200 has a partially spherical outer surface 202 and a cavity 204, and is made from a material in accordance with any of the four above described embodiments. In an embodiment, the substrate is made from a stainless steel material such as 420 stainless steel or 440C stainless steel, having a CTE of 10.2 and 10.1 ppm/° C. at 20° C., respectively. The optic 300 is a monolithic cube-corner retroreflector 302 fixedly disposed within the cavity 204 via the adhesive 102.

With respect to the above described fourth embodiment, the optic 300 is made from a material having a CTE substantially equal to the CTE of the substrate material, such as 11.7 ppm/° C. at 20° C. for low-carbon steel for example, as compared to 10.1 ppm/° C. at 20° C. for 440C stainless steel for example. The adhesive 102 is disposed between the optic 300 and the substrate 200 and fixedly adheres the optic 300 to the substrate 200. The adhesive 102 is made from a material having a CTE substantially equal to the CTE of the substrate material, such as 13.5 ppm/° C. at 20° C. for an epoxy available from Master Bond for example. Due to the CTE differences between the substrate 200, optic 300 and adhesive 102, an alternative arrangement would purposefully extend the bottom of the slug of the optic 5 mm, or some other dimension suitable for a purpose disclosed herein, below the vertex of the optic and to make adhesive thickness 0.1 mm, or some other dimension suitable for a purpose disclosed herein, which for a 30° C. temperature change would cause the vertex to move by (11.7E-6-10.1E-6)(30)(5 mm)+(13.5E-6-10.1E-6)(30)(0.1 mm)=0.24 micrometer, which is a relatively small movement. As such, the amount of slug material below the vertex of the optic, and the thickness of the adhesive, may be appropriately selected to accommodate for differences in CTE values of the materials employed.

By controlling the manufacturing tolerances associated with fabrication of the substrate 200 and fabrication of the optic 300, a tight fit between the optic 300 and the cavity 204 of the substrate 200 can be achieved. However, due to material and/or manufacturing limitations, a void (gap) 104, however small it may be and with reference now to FIG. 1B, will exist between the optic 300 and the cavity 204. The size of the void 104 is exaggerated for illustration purposes. As depicted in FIG. 1B, the adhesive 102 bridges the void 104 between the substrate 200 and the optic 300 in the region where the adhesive 102 is disposed, such as at the bottom of the cavity 204 for example. In an embodiment, a potting material 106 (depicted as a dotted line in FIG. 1B) is disposed in the void 104 to completely or substantially fill the void 104 between the substrate 200 and the optic 300 where the adhesive 102 is not disposed, such as along the side walls of the cavity 204 for example. In an embodiment, the potting material 106 is RTV (room temperature vulcanizing) Silicone, but may be any other potting material suitable for a purpose disclosed herein.

While certain combinations of features relating to an SMR have been described herein, it will be appreciated that these certain combinations are for illustration purposes only and that any combination of any of these features may be employed, explicitly or equivalently, either individually or in combination with any other of the features disclosed herein, in any combination, and all in accordance with an embodiment of the invention. Any and all such combinations are contemplated herein and are considered within the scope of the invention disclosed.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A spherically mounted retroreflector (SMR), comprising:
    a substrate comprising a partially spherical outer surface and a cavity, the partially spherical outer surface having a sphere center;
    an optic comprising a cube-corner retroreflector fixedly disposed within the cavity, the cube-corner retroreflector having an optical vertex; and
    an adhesive disposed between the optic and the substrate that fixedly adheres the optic to the substrate;
    wherein the optical vertex is coincident with the sphere center;
    wherein the substrate is made from a ferromagnetic material and comprises an electroless nickel coating.

2. The SMR of claim 1, wherein the cavity comprises a cube-corner cavity onto which retroreflector surfaces are directly replicated.

3. The SMR of claim 1, wherein the optic and substrate have a void therebetween where the adhesive is not disposed, and further comprising:
    a potting material disposed in the void.

4. The SMR of claim 1, wherein the cavity is sized to hold the cube-corner retroreflector.

5. The SMR of claim 4, wherein the cube-corner retroreflector is a replicated optic.

6. The SMR of claim 5, wherein the cavity is cylindrical.

7. A method of making a spherically mounted retroreflector (SMR), comprising:
    coating a ferromagnetic metal sphere with electroless nickel;
    diamond turning the nickel into a spherical portion;
    applying a protective coating to an outer surface of the nickel;
    forming a cavity within the sphere; and
    embedding and adhering a cube-corner retroreflector in the cavity.

8. The method of claim 7, wherein the forming a cavity comprises forming a cylindrical cavity.

9. The method of claim 7, wherein the forming a cavity comprises forming a cube-corner cavity and the embedding and adhering a cube-corner retroreflector comprises replicating retroreflector surfaces in the cube-corner cavity.

10. The method of claim 9, wherein the forming a cavity further comprises machining via a small drill bit fine intersection lines between each pair of three orthogonal planar surfaces of the cube-corner retroreflector.

11. The method of claim 9, wherein the forming a cavity further comprises machining via electrical discharge machining fine intersection lines between each pair of three orthogonal planar surfaces of the cube-corner retroreflector.

12. A spherically mounted retroreflector (SMR), comprising:
- a substrate comprising a partially spherical outer surface and a cavity, the partially spherical outer surface having a sphere center;
- an optic comprising a cube-corner retroreflector fixedly disposed within the cavity, the cube-corner retroreflector having an optical vertex; and
- an adhesive disposed between the optic and the substrate that fixedly adheres the optic to the substrate;
- wherein the optical vertex is coincident with the sphere center;
- wherein the substrate is made from an un-heat-treated ferromagnetic material and includes a diamond like carbon (DLC) outer coating.

13. A spherically mounted retroreflector (SMR) comprising:
- a substrate comprising a partially spherical outer surface and a cavity, the partially spherical outer surface having a sphere center;
- an optic comprising a cube-corner retroreflector fixedly disposed within the cavity, the cube-corner retroreflector having and optical vertex; and
- an adhesive disposed between the optic and the substrate that fixedly adheres the optic to the substrate;
- wherein the optical vertex is coincident with the sphere center;
- wherein the substrate includes a diamond like carbon (DLC) outer coating; and
- wherein the substrate is made from a ferromagnetic material. material.

14. A spherically mounted retroreflector (SMR) comprising:
- a substrate comprising a partially spherical outer surface and a cavity, the partially spherical outer surface having a sphere center;
- an optic comprising a cube-corner retroreflector fixedly disposed within the cavity, the cube-corner retroreflector having an optical vertex; and
- an adhesive disposed between the optic and the substrate that fixedly adheres the optic to the substrate;
- wherein the optical vertex is coincident with the sphere center;
- wherein the substrate includes a diamond like carbon (DLC) outer coating; and
- wherein the optic and substrate have a void therebetween where the adhesive is not disposed, and further comprising:
- a potting material disposed in the void.

15. The SMR of claim 12, wherein the cavity comprises a cylindrical cavity.

16. The SMR of claim 15, wherein the cube-corner retroreflector comprises a cylindrical slug comprising the cube-corner retroreflector.

17. The SMR of claim 12, wherein the cavity comprises a cube-corner cavity.

18. The SMR of claim 17, wherein the cube-corner retroreflector comprises a replicated cube-corner retroreflector disposed in the cube-corner cavity.

19. A method of making a spherically mounted retroreflector (SMR), comprising:
- forming a cavity within the sphere;
- polishing the sphere to a smooth finish;
- coating a ferromagnetic metal sphere with a diamond like carbon (DLC) coating; and
- embedding and adhering a cube-corner retroreflector in the cavity.

20. The method of claim 19, wherein the forming a cavity comprises forming a cylindrical cavity.

21. The method of claim 19, wherein the coating a ferromagnetic metal sphere comprises coating a sphere made from mild steel.

22. The method of claim 19, wherein the forming a cavity comprises forming a cube-corner cavity.

23. The method of claim 22, wherein the forming a cavity further comprises machining via a small drill bit fine intersection lines between each pair of three orthogonal planar surfaces of the cube-corner retroreflector.

24. The method of claim 22, wherein the forming a cavity further comprises machining via electrical discharge machining fine intersection lines between each pair of three orthogonal planar surfaces of the cube-corner retroreflector.

25. A spherically mounted retroreflector (SMR), comprising:
- a substrate comprising a partially spherical outer surface and a cavity, the partially spherical outer surface having a sphere center;
- an optic comprising a cube-corner retroreflector fixedly disposed within the cavity, the cube-corner retroreflector having an optical vertex; and
- an adhesive disposed between the optic and the substrate that fixedly adheres the optic to the substrate;
- wherein the optical vertex is coincident with the sphere center;
- wherein the substrate and the optic are each made from a same ferromagnetic material.

26. The SMR of claim 25, wherein the same ferromagnetic material comprises a mild steel.

27. The SMR of claim 25, wherein the cavity comprises a cylindrical cavity.

28. The SMR of claim 25, wherein the ferromagnetic material of the substrate comprises an electroless nickel outer coating.

29. The SMR of claim 25, wherein the ferromagnetic material of the substrate comprises a chromate conversion outer coating.

30. The SMR of claim 25, wherein the optic and substrate have a void therebetween where the adhesive is not disposed, and further comprising:
- a potting material disposed in the void.

31. The SMR of claim 25, wherein the cube-corner retroreflector comprises a cylindrical slug comprising the cube-corner retroreflector.

32. The SMR of claim 28, wherein the adhesive is disposed in a thin layer over a full exterior area of the cylindrical slug.

33. A method of making a spherically mounted retroreflector (SMR), comprising:
- forming a sphere from a ferromagnetic material;
- forming an optic from the ferromagnetic material, same ferromagnetic material as the ferromagnetic material of the sphere;
- forming a cavity within the sphere; and
- embedding and adhering the optic in the cavity.

34. The method of claim 33, further comprising:
- coating the ferromagnetic sphere with electroless nickel;
- diamond turning the nickel into a spherical portion; and
- applying a protective coating to an outer surface of the nickel.

35. The method of claim 33, further comprising:
- polishing the sphere to a smooth finish; and
- coating the ferromagnetic sphere with a diamond like carbon (DLC) coating.

36. The method of claim 33, further comprising:
coating the ferromagnetic sphere with a chromate conversion coating.

37. The method of claim 33, wherein the forming a cavity comprises forming a cylindrical cavity.

38. The method of claim 33, wherein the forming an optic comprises forming a cylindrical slug comprising the cube-corner retroreflector.

39. A spherically mounted retroreflector (SMR), comprising:
a substrate comprising a partially spherical outer surface and a cavity, the substrate being made from a stainless steel material having a defined coefficient of thermal expansion (CTE);
an optic comprising a cube-corner retroreflector fixedly disposed within the cavity, the optic being made from a material having a CTE substantially equal to the CTE of the substrate material; and
an adhesive disposed between the optic and the substrate that fixedly adheres the optic to the substrate, the adhesive being made from a material having a CTE substantially equal to the CTE of the substrate material.

40. The SMR of claim 39, wherein:
the optic material comprises a mild steel.

41. The SMR of claim 39, wherein the optic and substrate have a void therebetween where the adhesive is not disposed, and further comprising:
a potting material disposed in the void.

42. The SMR of claim 39, wherein:
the CTE of the substrate material and the CTE of the optic material differ by no more than 2.0 ppm/-° C. at 20° C.; and
the CTE of the substrate material and the CTE of the adhesive material differ by no more than 3.5 ppm/° C. at 20° C.

43. The SMR of claim 39, wherein:
the substrate material comprises 420 stainless steel or 440C stainless steel.

* * * * *